United States Patent [19]
Iyengar

[11] Patent Number: 5,663,955
[45] Date of Patent: Sep. 2, 1997

[54] ECHO CANCELLER SYSTEM WITH SHARED COEFFICIENT MEMORY

[75] Inventor: Vasu Iyengar, Allentown, Pa.

[73] Assignee: Lucent Technologies Inc., Murray Hill, N.J.

[21] Appl. No.: 519,500

[22] Filed: Aug. 25, 1995

[51] Int. Cl.⁶ .................................................. H04B 3/23
[52] U.S. Cl. .................................... 370/291; 379/411
[58] Field of Search ................................ 370/286, 287, 370/289, 290, 291; 379/410, 411

[56] References Cited

U.S. PATENT DOCUMENTS

| | | | |
|---|---|---|---|
| 4,564,934 | 1/1986 | Macchi | 370/32 |
| 4,629,829 | 12/1986 | Puhl et al. | 379/58 |
| 4,903,247 | 2/1990 | Van Gerwen et al. | 367/135 |
| 4,912,758 | 3/1990 | Arbel | 379/388 |
| 5,146,494 | 9/1992 | Harman | 379/411 |
| 5,263,020 | 11/1993 | Yatsuzuka et al. | 370/32.1 |
| 5,313,498 | 5/1994 | Sano | 375/103 |
| 5,353,348 | 10/1994 | Sendyl et al. | 379/410 |
| 5,371,789 | 12/1994 | Hirano | 379/410 |
| 5,390,250 | 2/1995 | Janse et al. | 379/410 |

FOREIGN PATENT DOCUMENTS 63-236422  1/1989  Japan .............................. H04B 3/23

OTHER PUBLICATIONS

Ochiai et al, "Echo Canceler with Two Echo Path Models" *IEEE Transactions On Communications*, vol. COM–25, No. 6, Jun. 1977, pp. 589–595.

Messerschmitt, "Echo Cancellation in Speech and Data Transmission", *IEEE Journal on Selected Areas in Communications*, vol. SAC–2, No. 2, Mar. 1984, pp. 283–298.

Tao et al., "A Cascadable VLSI Echo Canceller", *IEEE Journal on Selected Areas in Communications*, vol. SAC–2, No. 2, Mar. 1984, pp. 298–303.

Sondhi et al., "Silencing Echos on the Telephone Network", *Proceedings of the IEEE*, vol. 68, No. 8, Aug. 1980, pp. 948–963.

Clemency et al., "Functional Design of a Voice–Switched Speakerphone", *The Bell System Technical Journal*, vol. XL, No. 3, May 1961, pp. 649–668.

Busala, "Fundamental Considerations in the Design of a Voice–Switched Speakerphone", *The Bell System Technical Journal*, vol. XXXIX, No. 2, Mar. 1960, pp. 265–294.

*Primary Examiner*—Russell W. Blum
*Attorney, Agent, or Firm*—David Sigmond; David L. Smith

[57] ABSTRACT

An echo canceller system includes first and second echo cancellers. Each echo canceller includes a foreground filter and an adaptive background filter, with the foreground filter providing the actual echo cancellation and the background filter updating the foreground filter. The echo canceller system also includes send and receive paths, a shared coefficient memory, and a controller for switching the shared coefficient memory between background filters in response to signals along the send and receive paths. The switching includes resetting the shared coefficient memory to prevent any transfer of filter coefficients between the background filters. The background filters operate one at a time, depending on which background filter has access to the shared coefficient memory, while the foreground filters operate simultaneously. The echo canceller system is well-suited for use in loudspeaking telephone sets, with the first echo canceller canceling a line echo through a hybrid transformer, and the second echo canceller canceling an acoustic echo between a loudspeaker and a microphone. The coefficient memory may be switched to the first background filter in response to a near-end signal without a far-end signal (i.e., transmit state), and switched to the second background filter in response to a far-end signal without a near-end signal (i.e., receive state).

40 Claims, 2 Drawing Sheets

ECHO CANCELLER SYSTEM WITH SHARED COEFFICIENT MEMORY

FIELD OF THE INVENTION

The invention relates generally to echo cancellers systems, and more particularly to echo canceller systems with at least two echo cancellers.

BACKGROUND OF THE INVENTION

Speech typically results in reflected waves. When the reflected wave arrives a very short time after the direct sound, it is perceived as a spectral distortion or reverberation. However, when the reflection arrives a few tens of milliseconds after the direct sound, it is heard as a distinct echo. Such echoes may be annoying, and under extreme conditions can completely disrupt a conversation.

Line echoes (i.e., electrical echoes) occur in telecommunications networks due to impedance mismatches at hybrid transformers that couple two-wire local customer loops to four-wire long-distance trunks. Ideally, the hybrid transformer passes the far-end signal at the four-wire receive port through to the two-wire transmit port without allowing leakage into the four-wire transmit port. However, this would require exact knowledge of the impedance seen at the two-wire ports, which in practice varies widely and can only be estimated. As a result, the leaking signal returns to the far-end talker as an echo. The situation can be further complicated by the presence of two-wire toll switches, allowing intermediate four-two-four wire conversions internal to the network. In telephone connections using satellite links with round-trip delays on the order of 600 ms, line echoes can become particularly disruptive.

Acoustic echoes occur in telecommunications networks due to acoustic coupling between a loudspeaker and a microphone (e.g., in a speakerphone). During a teleconference, where two or more parties are connected by a full-duplex link, an acoustic reflection of the far-end talker through the near-end conference room is returned to the far-end talker as an echo. Acoustic echo cancellation tends to be more difficult than line echo cancellation since the duration of the acoustic path is usually several times longer (100–400 ms) than typical electrical line paths (20 ms), and the acoustic path may change rapidly at any time due to opening doors, moving persons, changing temperatures, etc.

Echo suppressors have been developed to control line echoes in telecommunications networks. Echo suppressors decouple the four-wire transmit port when signal detectors determine that there is a far-end signal at the four-wire receive port without any near-end signal at the two-wire receive port. Echo suppressors, however, are generally ineffective during double-talking when speakers at both ends are talking simultaneously. During double-talk, the four-wire transmit port carries both the near-end signal and the far-end echo signal. Furthermore, echo suppressors tend to produce speech clipping, especially during long delays caused by satellite links.

Echo cancellers have been developed to overcome the shortcomings of echo suppressors. Echo cancellers include an adaptive filter and a subtracter. The adaptive filter attempts to model the echo path. The incoming signal is applied to the adaptive filter which generates a replica signal. The replica signal and the echo signal are applied to the subtracter. The subtracter subtracts the replica signal from the echo signal to produce an error signal. The error signal is fed back to the adaptive filter, which adjusts its filter coefficients (or taps) in order to minimize the error signal. The filter coefficients are stored in a coefficient memory. In this manner, the filter coefficients converge toward values that optimize the replica signal in order to cancel the echo signal. Echo cancellers offer the advantage of not disrupting the signal path. Economic considerations place limits on the fineness of sampling times and quantization levels in digital adaptive filters, but technological improvements are relaxing these limits. Echo cancellers were first deployed in the U.S. telephone network in 1979, and currently are virtually ubiquitous in long-distance telephone circuits. See generally Messerschmitt, "Echo Cancellation in Speech and Data Transmission", *IEEE Journal on Selected Areas in Communications*, Vol. SAC-2, No. 2, March 1984, pp. 283–298; and Tao et al., "A Cascadable VLSI Echo Canceller", *IEEE Journal on Selected Areas in Communications*, Vol. SAC-2, No. 2, March 1984, pp. 298–303.

In order for the adaptive filter to correctly model the echo path, the output signal of the echo path must originate solely from its input signal. During double-talking, speech at the near-end that acts as uncorrelated noise causes the filter coefficients to diverge (or drift). In open-loop paths, coefficient drift is usually not catastrophic although a brief echo may be heard until convergence is established again. In closed-loop paths (which typically include acoustic echo paths), however, coefficient drift may lead to an unstable system which causes howling and makes convergence difficult. To alleviate this problem, double-talk detectors are commonly used for disabling the adaptation as double-talking occurs. Double-talk detectors may employ, for instance, Geigel's test to detect double-talking. Unfortunately, double-talk detectors fail to indicate the presence of double-talking for a time period (e.g., a whole syllable) after double-talking begins. During this time period, the coefficients may drift and lead to howling as mentioned above. Furthermore, double-talking becomes increasingly difficult to detect as the acoustic echo becomes large in comparison to the near-end signal.

An echo canceller employing adaptive and non-adaptive filters is disclosed in Ochiai et al., "Echo Canceler with Two Echo Path Models", *IEEE Transactions On Communications*, Vol. COM-25, No. 6, June 1977, pp. 589–595. Ochiai et al. discloses an echo canceller with a non-adaptive filter and an adaptive filter arranged in parallel. The adaptive filter includes an adaptation processor, whereas as non-adaptive filter is devoid of an adaptation processor and must be updated by the adaptive filter. Each filter generates a replica of the echo signal. The filter coefficients of the adaptive filter are transferred into the non-adaptive filter when the replica signal from the adaptive filter provides a better estimate of the echo signal than the replica signal of the non-adaptive filter. Therefore, during uncorrelated double-talking, the non-adaptive filter is relatively immune from coefficient drift in the adaptive filter.

Another echo canceller employing adaptive and non-adaptive filters is disclosed in U.S. application Ser. No. 08/519,267, filed Aug. 25, 1995, entitled "Echo Canceller with Adaptive and Non-Adaptive Filters" by R. E. Crochiere and V. Iyengar, Case 8-2, assigned to the assignee of the present invention, and incorporated herein by reference. Crochiere et al. discloses an echo canceller with a non-adaptive filter and an adaptive filter arranged in cascade. The adaptive filter includes an adaptation processor, whereas as non-adaptive filter is devoid of an adaptation processor and must be updated by the adaptive filter. The non-adaptive filter generates a replica of the echo signal, whereas the adaptive filter generates a replica of a send output signal.

The filter coefficients in the adaptive filter are accumulated on related filter coefficients in the non-adaptive filter, and then reset, when the combined cancellation of the filters is better than that of the non-adaptive filter alone. Therefore, during uncorrelated double-talking, the non-adaptive filter is relatively immune to coefficient drift in the adaptive filter. In addition, a spectral detector prevents the update operation in the presence of narrowband signals.

Another echo canceller employing several adaptive filters is disclosed in U.S. Pat. No. 5,263,020 to Yatsuzuka et al. The echo canceller in Yatsuzuka et al. includes an adaptive main echo estimator and an adaptive sub echo estimator arranged in cascade. The main echo estimator and the sub echo estimator each include adaptation processors. The main echo estimator generates a replica of the echo signal, whereas the sub echo estimator generates a replica of a send output signal. The main echo estimator has a small step gain for updating filter coefficients so that the response to an echo is slow, while the sub echo estimator has a large step gain and quick response for an echo. In an ordinary mode, the two echo estimators operate independently from each other. In an accumulating mode, the filter coefficients in the sub echo estimator are accumulated on related filter coefficients in the main echo estimator. In a reset mode, the coefficients of the sub echo estimator are reset, and then the mode is switched to the ordinary mode.

Echo canceller systems are known which include first and second echo cancellers for cancelling respective first and second echos across different echo paths. For example, in a loudspeaking telephone set with full-duplex operation, an acoustic echo path may arise between a loudspeaker and a microphone, and a line echo path may arise at a hybrid transformer which connects the set's four-wire system to a two-wire local customer loop. A first echo canceller may be used for cancelling the line echo, and a second echo canceller may be used for cancelling the acoustic echo. Each echo canceller is likely to require continuous adaptive processing, which places heavy demands on processing power (or MIPs). Furthermore, the first and second echo cancellers may each include two or more filters, as described by Ochiai et al., Crochiere et al., and Yatsuzuka et al., supra, with each filter requiring its own coefficient memory (or memory space). As a result, echo canceller systems may require a large amount of processing power and memory space.

Based on the foregoing, there is a need for an echo canceller system with more efficient use of processing power and memory space.

SUMMARY OF THE INVENTION

A primary aspect of the invention is an echo canceller system with a shared coefficient memory.

In accordance with one aspect of the invention, an echo canceller system comprises first and second echo cancellers. Each echo canceller includes a foreground filter and a background filter. The foreground filters have dedicated coefficient memories, whereas the background filters do not. The echo canceller system also includes a shared coefficient memory, and a controller for switching the shared coefficient memory between the background filters. The switching includes resetting the shared coefficient memory to prevent any transfer of filter coefficients between the background filters. The background filters operate one at a time, depending on which is coupled to the shared coefficient memory. Therefore, the background filters share memory space and processing power.

In accordance with another aspect of the invention, in each echo canceller the background filter updates the foreground filter, and the foreground filter provides the actual echo cancellation. The foreground filters operate simultaneously, although the foreground filters are updated one at a time, depending on which background filter is coupled to the shared coefficient memory. Thus, coefficient updates for the foreground filters are initially stored in the shared coefficient memory.

In accordance with another aspect of the invention, the echo canceller system includes a receive path with a receive input port and a receive output port, and a send path with a send input port and a send output port, with the first echo canceller cancelling an echo between the receive output port and the send input port, and the second echo canceller cancelling an echo between the send output port and the receive input port. The controller switches the shared coefficient memory from the second background filter to the first background filter in response to signals at the receive path and the send path indicating a first state, and the controller switches the shared coefficient memory from the first background filter to the second background filter in response to signals at the receive path and the send path indicating a second state. In this manner, the controller couples the coefficient memory to the echo canceller with the greatest need for adaptive operation.

The invention is especially well-suited for use in a loudspeaking telephone set, in which the first echo canceller cancels a line echo through a hybrid transformer in response to a near-end signal without a far-end signal (i.e., transmit state), and the second echo canceller cancels an acoustic echo between a loudspeaker and a microphone in response to a far-end signal without a near-end signal (i.e., receive state). In this manner, the first and second echo cancellers provide simultaneous echo cancellation from the foreground filters, although the echo cancellers are updated one at a time, depending on whether there is a transmit state or a receive state.

BRIEF DESCRIPTION OF THE DRAWING

The invention, together with its various features and advantages, can be readily understood from the following detailed description taken in conjunction with the accompanying drawing, in which.

DETAILED DESCRIPTION

Figure 1:
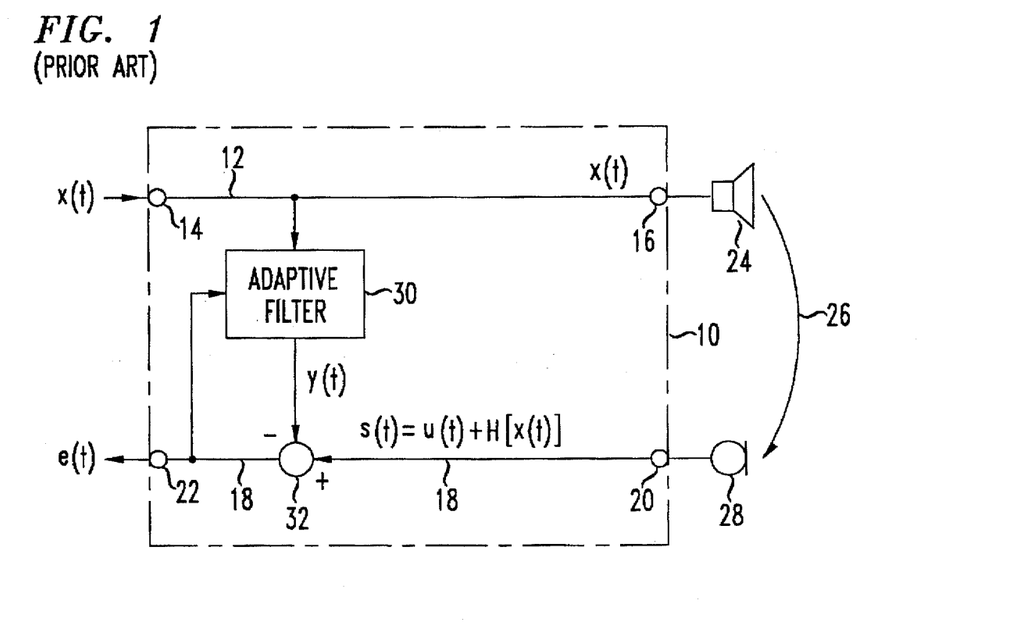
FIG. 1 shows a schematic diagram illustrating the manner in which an echo canceller is generally used as part of a loudspeaking telephone set.

FIG. 1 shows a simplified schematic diagram illustrating the manner in which an echo canceller is generally used as part of a loudspeaking telephone set. Echo canceller 10 includes a receive path 12 with receive input port 14 and receive output port 16, and send path 18 with send input port 20 and send output port 22. A receive input signal $x(t)$, representing a far-end signal, is applied to receive input port 14. Receive input signal $x(t)$ is coupled via path 12 to receive output port 16, which couples signal $x(t)$ to loudspeaker 24. Acoustic echo path 26 with transfer characteristic $H[t]$ is located between loudspeaker 24 and microphone 28. Echo path 26 causes signal x(t) at loudspeaker 24 to appear as echo signal H[x(t)] at microphone 28. Microphone 28 also generates near-end signal u(t) due to speech at the near-end. Therefore, microphone 28 generates send input signal s(t) consisting of near-end signal u(t) added to echo signal H[x(t)] by way of superposition. Echo canceller 10 further comprises adaptive digital transversal filter 30 and subtracter 32. Adaptive filter 30 has a finite impulse response (FIR), and its filter coefficients are adaptively updated to model the transfer characteristic H[t] at sample intervals. Adaptive filter 30 synthesizes a replica signal y(t) as an estimate of the undesired echo signal H[x(t)] in response to receive input signal x(t). Subtracter 32 subtracts replica signal y(t) from send input signal s(t) to form error signal e(t). Error signal e(t) is coupled to send output port 22 to provide the send output signal. Error signal e(t) is also fed back to adaptive filter 30. Error signal e(t) cart be described as follows:

$$e(t)=u(t)+[H[x(t)]-y(t)]$$

From this expression, it is clear that signal e(t) represents near-end signal u(t) when replica signal y(t) is a reliable estimate of echo signal H[x(t)].

Generally, the transfer characteristic H[t] of echo path 26 will be time-varying. Echo signal H[x(t)] approximates the linear convolution of signal x(t) with the impulse response h(t) of echo path 26. Therefore, adaptive filter 30 adjusts its impulse response w(t) as best it can to match impulse response h(t). The adaptive adjustment of filter 32 is controlled by error signal e(t). This adaptive adjustment is continued as long as there is a correlation between error signal e(t) and receive input signal x(t). When receive input signal x(t) is present and near-end signal u(t) is absent (i.e., far-end speech without near-end speech), adaptive filter 30 generates replica signal y(t) as a reliable estimate of echo signal H[x(t)]. When, however, both x(t) and u(t) are present (i.e., double-talking), adaptive filter 30 can become grossly misadjusted due to near-end signal u(t) as a disturbing factor in error signal e(t). This misadjustment prevents replica signal y(t) from providing a reliable estimate of H[x(t)], in which case H[x(t)] is improperly or inadequately canceled.

Further discussion of echo cancellers appears in U.S. Pat. Nos. 5,390,250; 5,371,789; 5,263,020; 5,146,494; 4,903,247; 4,564,934; and in the articles by Ochiai et at., Messerschmitt, and Tao et al., supra, which are all incorporated herein by reference.

Since the present invention is best performed by a digital echo canceller, the following description will utilize discrete-time modeling. Discrete-time modeling can be obtained by assuming in FIG. 1 that signals x(t) and s(t) are applied to analog-to-digital converters before being applied to input ports 14 and 20, respectively, and likewise that signals x(t) and e(t) are received from digital-to-analog converters coupled to output ports 16 and 22, respectively, and further that all the relevant signals in echo canceller 10 are digital signals. These digital signals are denoted in a conventional manner so that, for example, x(k) denotes a quantized sample of continuous-time sample x(t) at instant t=kT, where 1/T is the sampling frequency at the appropriate (Nyquist) rate. Digital-to-analog and analog-to-digital converters may be employed for connecting the echo canceller 10 with analog channels.

Figure 2:
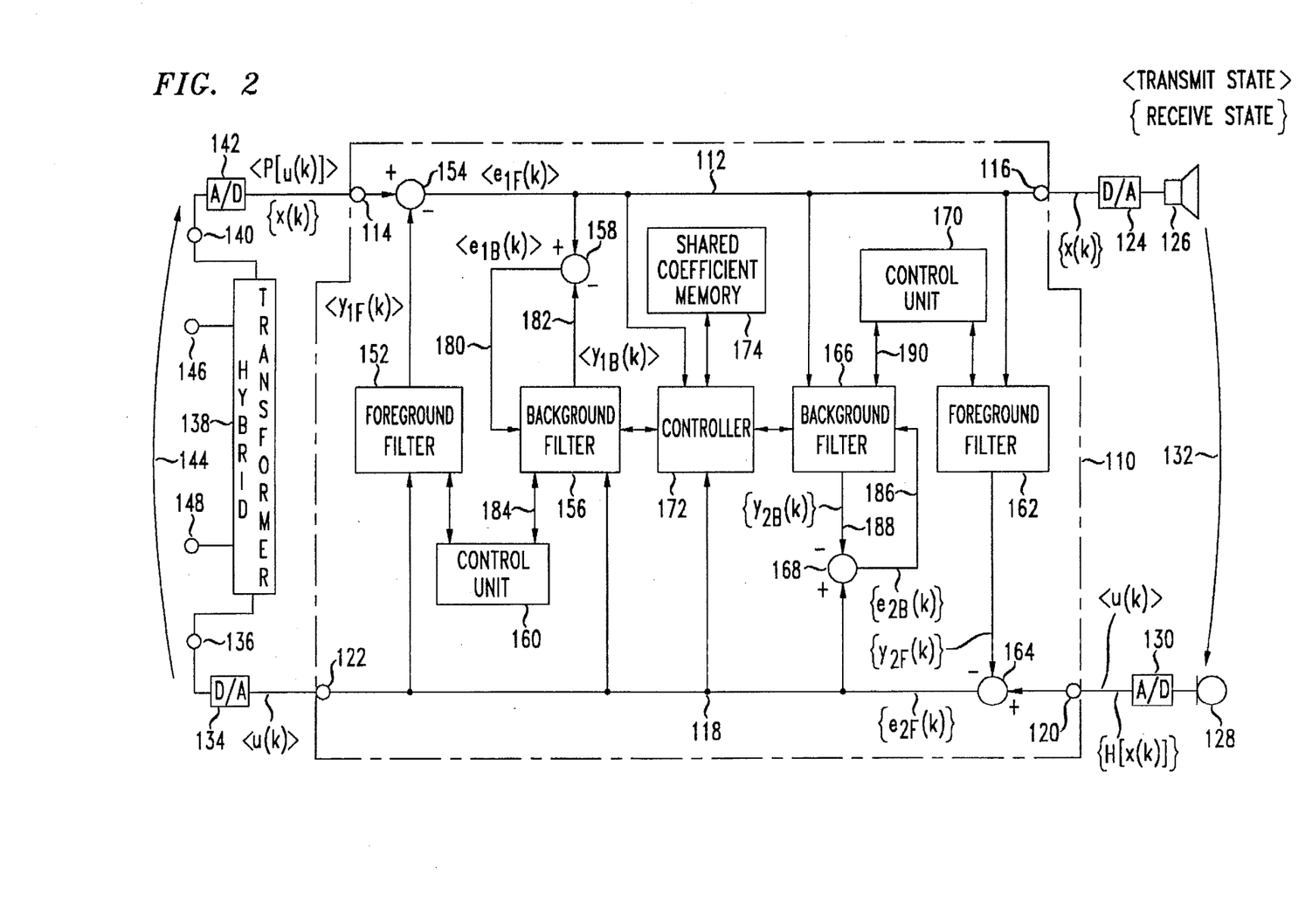
FIG. 2 shows a schematic diagram illustrating an embodiment of an echo canceller system according to the invention.

FIG. 2 shows a schematic diagram of an embodiment of an echo canceller system according to the invention. In this embodiment, the echo canceller system is part of an integrated circuit chip, which is part of a loudspeaking telephone set 100. Echo canceller system 110 includes a receive path 112 with receive input port 114 and receive output port 116, and send path 118 with send input port 120 and send output port 122. Port 116 is coupled via digital-to-analog converter 124 to loudspeaker 126. Microphone 128 is coupled via analog-to-digital converter 130 to port 120. Acoustic echo path 132 is disposed between loudspeaker 126 and microphone 128. Port 122 is coupled via digital-to-analog converter 134 to port 136 of hybrid transformer 138, and port 140 of hybrid transformer 138 is coupled via analog-to-digital converter 142 to port 114. Hybrid transformer 138 provides conversion between two-wire signals and four-wire signals. Hybrid transformer ports 136 and 140 interface with a four-wire full-duplex system inside telephone set 100, whereas hybrid transformer ports 146 and 148 interface with a two-wire local customer loop outside telephone set 100. Hybrid transformer 138 also provides line echo path 144 between ports 122 and 114.

Echo canceller system 110 also includes first and second echo cancellers. The first echo canceller includes first foreground filter 152 coupled to first foreground subtracter 154, first adaptive background filter 156 coupled to first background subtracter 158, and first control unit 160. The second echo canceller includes second foreground filter 162 coupled to second foreground subtracter 164, second adaptive background filter 166 coupled to second background subtracter 168, and second control unit 170. The first echo canceller is designed to cancel a line echo across line echo path 144. The second echo canceller is designed to cancel an acoustic echo across acoustic echo path 132. In the first echo canceller, foreground filter 152 provides the actual echo cancellation, and control unit 160 determines when filter coefficients of background filter 156 can be used to update filter coefficients of foreground filter 152 in accordance with a first function. Likewise, in the second echo canceller, foreground filter 162 provides the actual echo cancellation, and control unit 170 determines when filter coefficients of background filter 166 can be used to update filter coefficients of foreground filter 162 in accordance with a second function.

It is noted that foreground filters 152 and 162 may be adaptive filters, in accordance with Yatsuzuka et al., supra, or, preferably, non-adaptive filters in accordance with Crochiere et al., supra. In either case, the update functions include accumulating the background filter coefficients on the foreground filter coefficients. It is further noted that although first subtracters 154 and 158 and second subtracters 164 and 168, are shown as arranged in cascade, alternatively, the first subtracters 154 and 158 can be arranged in parallel, and likewise, the second subtracters 164 and 168 can be arranged in parallel, in accordance with Ochiai et al., supra. With the parallel arrangement, the update functions include transferring the background filter coefficients to the foreground filter coefficients.

Foreground filters 152 and 162 each have their own dedicated coefficient memories or memory space. For instance, a first coefficient memory (not shown) is used exclusively by filter 152, and a second coefficient memory (not shown) is used exclusively by filter 162. Background filters 156 and 166, however, lack dedicated coefficient memories. Accordingly, echo canceller system 110 further includes controller 172 and shared coefficient memory 174. Controller 172 switches shared coefficient memory 174 between background filters 156 and 166 so that one but not both of background filters 156 and 166 can store its respective filter coefficients in shared coefficient memory 174. Thus, controller 174 prevents background filters 156 and 166 from simultaneously accessing shared coefficient memory 174. In addition, controller 174 resets shared coefficient memory 174 when shared coefficient memory 174 is switched between background filters 156 and 166, thereby preventing any transfer of filter coefficients between background filters 156 and 166. As a result, shared coefficient memory 174 need not simultaneously store filter coefficients associated with background filters 156 and 166. Although foreground filters 152 and 162 operate simultaneously, background filters 156 and 166 operate one at a time, depending on which background filter has access to shared coefficient memory 174. Consequently, control units 160 and 170 perform their respective update functions one at a time, depending on which background filter is coupled to the shared coefficient memory.

Any number of algorithms may be used for determining when to switch the shared coefficient memory between the background filters. In the current embodiment, controller 172 performs the switching operation in response to signal levels at receive path 112 and send path 118. Shared coefficient memory 174 is coupled to background filter 156 and decoupled from background filter 166, thereby allowing background filter 156 to operate and preventing background filter 166 from operating, when the signal level at send path 118 exceeds the signal level at receive path 112. Likewise, shared coefficient memory 174 is coupled to background filter 166 and decoupled from background filter 156, thereby allowing background filter 166 to operate and preventing background filter 156 from operating, when the signal level at receive path 112 exceeds the signal level at send path 118.

For purposes of illustration, the operation of echo canceller system 110 is described with reference to a transmit state and a receive state. In FIG. 2, the signals associated with the transmit state are shown inside arrow symbols <>, and the signals associated with the receive state are shown inside bracket symbols { }.

Detectors such as state controllers for determining which talker is active in a voice-switched speakerphone system are well known in the art. Such detectors generally switch states in response to signal levels at the send and receive paths. Many switching schemes are available. See, for instance, Sondhi et al., "Silencing Ethos on the Telephone Network", *Proceedings of the IEEE*, Vol. 68, No. 8, August 1980, pp. 948–963; Clemency et al., "Functional Design of a Voice-Switched Speakerphone", *The Bell System Technical Journal*, Vol. XL, No. 3, May 1961, pp. 649–668; and Busala, "Fundamental Considerations in the Design of a Voice-Switched Speakerphone", *The Bell System Technical Journal*, Vol. XXXIX, No. 2, March 1960, pp. 265–294; each of which is incorporated herein by reference. For example, the transmit state may occur when send input signal u(k) is above a first threshold, and receive input signal x(k) is below a second threshold. Likewise, the receive state may occur when receive input signal x(k) is above a third threshold, and send input signal u(k) is below a fourth threshold. For convenience, the first, second, third and fourth thresholds may be essentially identical. The thresholds may relate, for instance, to the instantaneous signal powers of signals x(k) and u(k) averaged over a specific period of time.

During the transmit state, send input signal u(k), representing a near-end signal generated by a near-end source, is present at send input port 120, and receive input signal x(k), representing a far-end signal generated by a far-end source, is absent at receive input port 114. Line echo path 144 has a transfer characteristic of P[z]. As a result, the receive input signal consists of line echo signal P[u(k)]. In this instance, controller 172 couples shared coefficient memory 174 to background filter 156, decouples shared coefficient memory 174 from background filter 166, and resets shared coefficient memory 174 thereby erasing the filter coefficients for background filter 166. Foreground filter 152 continues to store first foreground filter coefficients in a first coefficient memory, and generates a replica signal $y_{1F}(k)$, as an estimate of echo signal P[u(k)], in response to signal u(k). At subtracter 154, echo signal P[u(k)] is applied to the addend input port, and replica signal $y_{1F}(k)$ is applied to the subtrahend input port. Subtracter 154 generates error signal $e_{1F}(k)$, representing the difference between signals P[u(k)] and $y_1(k)$. Error signal $e_{1F}(k)$ is transferred along receive path 112 to receive output port 116. Furthermore, background filter 156 stores first background filter coefficients in shared coefficient memory 174, and generates a replica signal $y_{1B}(k)$, as an estimate of signal $y_{1F}(k)$, in response to signal u(k). At subtracter 158, signal $y_{1F}(k)$ is applied to the addend input port, and replica signal $y_{1B}(k)$ is applied to the subtrahend input port. Subtracter 158 generates error signal $e_{1B}(k)$, representing the difference between signals $e_{1F}(k)$ and $y_{1F}(k)$. Error signal $e_{1B}(k)$ is applied to a feedback input port of background filter 156 for further adaptive processing. Control unit 160 measures error signals $e_{1F}(k)$ and $e_{1B}(k)$ to determine whether foreground filter 152 should be updated. Background filter 166 is rendered inoperative by being decoupled from shared coefficient memory 174, although foreground filter 162 continues to store its filter coefficients in the second coefficient memory and operate during the transmit state. For convenience of explanation, it is assumed that any acoustic echo signal $H[e_{1F}(k)]$ that occurs at port 120 is negligible.

During the receive state, receive input signal x(k), representing the far-end signal, is present at receive input port 114, and send input signal u(k), representing the near-end signal, is absent at send input port 120. Acoustic echo path 132 has a transfer characteristic of H[z]. As a result, the send input signal consists of acoustic echo signal H[x(k)]. In this instance, controller 172 couples shared coefficient memory 174 to background filter 166, decouples shared coefficient memory 174 from background filter 156, and resets shared coefficient memory 174 thereby erasing the filter coefficients for background filter 156. Foreground filter 162 stores second foreground filter coefficients in a second coefficient memory, and generates a second replica signal $y_{2F}(k)$, as an estimate of echo signal H[x(k)], in response to signal x(k). Subtracter 164 receives signal H[x(k)] at an addend input port, and receives signal $y_{2F}(k)$ at a subtrahend input port. Subtracter 164 generates error signal $e_{2F}(k)$, representing the difference between signals H[x(k)] and $y_{2F}(k)$. Error signal $e_{2F}(k)$ is transferred along send path 118 to send output port 122. Furthermore, background filter 166 stores second background filter coefficients in shared coefficient memory 174, and generates a replica signal $y_{1B}(k)$, as an estimate of signal $e_{2F}(k)$, in response to signal u(k). At subtracter 168, signal $e_{2F}(k)$ is applied to the addend input port, and replica signal $y_{1B}(k)$ is applied to the subtrahend input port. Subtracter 168 generates error signal $e_{1B}(k)$, representing the difference between signals $e_{2F}(k)$ and $y_{2F}(k)$. Error signal $e_{1B}(k)$ is applied to a feedback input port of background filter 166 for further adaptive processing. Control unit 170 measures error signals $e_{2F}(k)$ and $e_{2B}(k)$ to determine whether foreground filter 162 should be updated. Background filter 156 is rendered inoperative by being decoupled from shared coefficient memory 174, although foreground filter 152 continues store its filter coefficients in the first coefficient memory and operate during the receive state. For convenience of explanation, it is assumed that any line echo signal $P[e_{2F}(k)]$ that occurs at port 114 is negligible.

Figure 3:
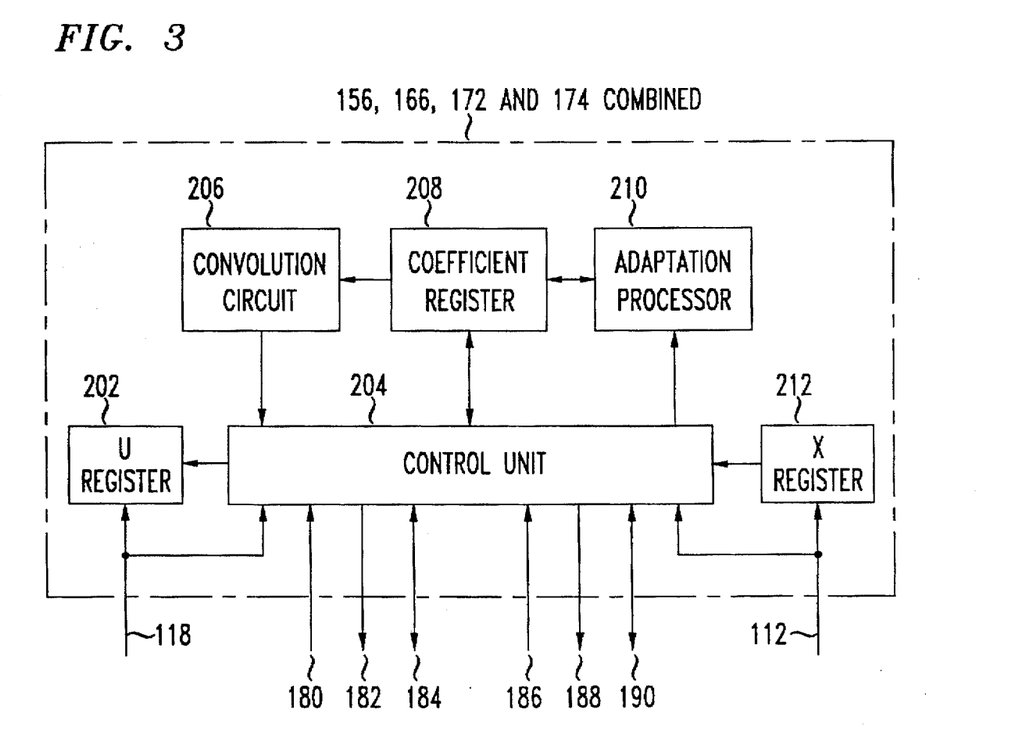
FIG. 3 shows a schematic diagram illustrating an embodiment of a portion of the echo canceller system in FIG. 2.

FIG. 3 shows a schematic diagram of an embodiment of a portion of echo canceller system 110. As is seen, background filters 156 and 166, controller 172, and shared coefficient memory 174 are implemented by U register 202, control unit 204, convolution circuit 206, coefficient register 208, adaptation processor 210, and X register 212. Signal paths 112, 118, 180, 182, 184, 186, 188 and 190 are shown for purposes of clarity.

Registers 202 and 212 are recirculated shift registers for storing samples of signals u(k) and x(k), respectively. Control unit 204 includes a signal detector (not shown) for detecting the levels of signals u(k) and x(k). Coefficient register 208 may be implemented, for instance, by random access memory (RAM).

Control unit 204 allows background filter 156 to operate by coupling U register 202 to convolution circuit 206 and to adaptation processor 210, signal paths 118 and 180 to adaptation processor 210, signal path 182 to convolution circuit 206, and signal path 184 to coefficient register 208, and decoupling the X register and signal paths 186, 188 and 190. Similarly, control unit allows background filter 166 to operate by coupling X register 212 to convolution circuit 206 and to adaptation processor 210, signal paths 112 and 186 to adaptation processor 210, signal path 188 to convolution circuit 206, and signal path 190 to coefficient register 208, and decoupling the U register and signal paths 180, 182 and 184. During operation of background filter 156, convolution circuit 204 generates replica signal $y_{1B}(k)$ by performing linear convolution on the samples stored in U register 202 with the filter coefficients stored in coefficient register 208. In addition, adaptation processor 210 adaptively corrects the filter coefficients stored in coefficient register 208, in response to signals u(k) and $e_{1B}(k)$, in order to minimize the level of signal $e_{1B}(k)$. During operation of background filter 166, convolution circuit 204 generates replica signal $y_{2B}(k)$ by performing linear convolution on the samples stored in X register 212 with the filter coefficients stored in coefficient register 208. In addition, adaptation processor 216 adaptively corrects the filter coefficients stored in coefficient register 208, in response to signals x(k) and $e_{2B}(k)$, in order to minimize the level of signal $e_{2B}(k)$. Advantageously, the memory space of coefficient register 208, and the processing power of adaptation processor 210, are shared between background filters 156 and 166.

Adaptation processor 210 may employ various adaptation algorithms that are well known in the art. For instance, the Least Mean Square (LMS) algorithm is an iterative stochastic gradient algorithm that minimizes the expected value of the squared error signal. Various modifications of the LMS algorithm, such as the Normalized Least Mean Square (NLMS) algorithm are also suitable. Alternatively, the Least Squares (LS) algorithm provides a noniterative, block-oriented adaptation algorithm.

U register 202 stores as many samples of u(k) as are necessary for a sufficiently accurate representation of the impulse response of line echo path 144. Likewise, X register 212 stores as many samples of x(k) as are necessary for a sufficiently accurate representation of the impulse response of acoustic echo path 132. Coefficient register 208 is preferably of sufficient size to store the filter coefficients for background filter 156, or background filter 166, but not both simultaneously. As should be clear, a smaller coefficient register would not permit background filters 156 and 166 to operate properly, whereas a larger coefficient register would waste memory space.

Suppose, for example, that the impulse response of line echo path 144 is assumed to be no greater than 10 ms, and the impulse response of acoustic echo path 132 is assumed to be no greater than 20 ms. Consistent with these assumptions, X register 212 stores N samples x(k), x(k−1), ... x(k−N−1) of receive input signal x(k), with each sample having a length of M bits, and U register 202 stores N/2 samples u(k), u(k−1), ... u(k−N/2−1) of send input signal u(k), with each sample having a length of M bits. In this instance, background filter 166 would employ N single-precision filter coefficients, each having a length of M bits, and background filter 156 would employ N/2 double-precision filter coefficients, each having a length of 2M bits. This would provide background filter 156 with roughly twice the accuracy of background filter 166. Furthermore, coefficient register 208 would use N addressable memory locations, with each memory location having a length of M bits. Of course, the same-sized coefficient register would be preferred if background filters 156 and 166 each used N filter coefficients of M bits each, or N/2 filter coefficients of 2M bits each.

Switching coefficient register 208 between background filters 156 and 166 includes resetting coefficient register 208. As part of switching coefficient register 208 from U register 202 to X register 212, control unit 204 resets coefficient register 208 before allowing adaptation processor 210 to begin generating filter coefficients for background filter 166. Likewise, as part of switching coefficient register 208 from X register 212 to U register 202, control unit 204 resets coefficient register 208 before allowing adaptation processor 216 to begin generating filter coefficients for background filter 156. The resetting prevents swapping filter coefficients between background filters 156 and 166.

Coefficient register 208 may be reset merely by clearing it. However, it is possible that a large portion of line echo path 144, or acoustic echo path 132, or both, is determined by telephone set 100, and therefore is known. Accordingly, echo paths 132 and/or 144 may be reasonably approximated by resetting coefficient register 208 to predetermined values under appropriate circumstances. For example, if the echo canceller being switched to coefficient register 208 has a cascade arrangement, such as in Crochiere et al. or Yatsuzuka et al., supra, then coefficient register 208 may be reset to predetermined filter coefficients when the foreground filter coefficients are cleared. Alternatively, if the echo canceller being switched to coefficient register 208 has a parallel arrangement, such as in Ochiai et al, supra, then coefficient register 208 may be reset to predetermined filter coefficients regardless of the foreground filter coefficients.

In the previous embodiments, the first and second echo cancellers have each consisted of a two filters. Of course, the first and second echo cancellers may each employ a single filter, or three filters, or more. The present invention is also well suited for sharing a coefficient memory, or several coefficient memories, between filters in various configurations such as parallel or cascade arrangements. In addition, the filters may be designed solely for canceling acoustic echos, line echos, or any combination of acoustic and line echos.

It should, of course, be understood that while the present invention has been described in terms of several illustrative embodiments, other arrangements and methods of operation will be apparent to those of ordinary skill in the art. For example, while the embodiments of the invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices. The invention is well suited for fabrication in a single VLSI integrated circuit chip. Finally, while the present invention has been described in reference to a particular system application, the inventive concept can be used in telephone channels including PSTN, ISDN and mobile communication networks, teleconferences including picture phones, video conferences, audio conferences, and virtually any application where echo cancellation is desired. Therefore, the invention should be limited only by the spirit and scope of the appended claims.

The invention claimed is:

1. An echo canceller system comprising:

a first echo canceller including a first foreground filter and a first background filter;

a second echo canceller including a second foreground filter and a second background filter;

a shared coefficient memory; and a controller for switching the shared coefficient memory between the first and second background filters.

2. The echo canceller system of claim 1, in which the controller prevents the shared coefficient memory from simultaneously storing filter coefficients of both the first and second background filters.

3. The echo canceller system of claim 1, in which switching the shared coefficient memory includes resetting the shared coefficient memory, thereby preventing any transfer of filter coefficients between the first and second background filters.

4. The echo canceller system of claim 1, in which the first foreground filter includes a first dedicated coefficient memory, the second foreground filter includes a second dedicated coefficient memory, the first background filter lacks a dedicated coefficient memory, and the second background filter lacks a dedicated coefficient memory.

5. The echo canceller system of claim 1, further including a receive path with a receive input port and a receive output port, and a send path with a send input port and a send output port, the controller for switching the shared coefficient memory between the first and second background filters in response to signals along the send and receive paths.

6. The echo canceller of claim 5, in which the controller is for switching the shared coefficient memory from the first background filter to the second background filter in response to at least a signal at the receive input port and a signal at the send input port, and the controller is for switching the shared coefficient memory from the second background filter to the first background filter in response to at least a signal at the send input port and a signal at the receive input port.

7. The echo canceller system of claim 6, in which switching the shared coefficient memory from the first background filter to the second background filter includes coupling the second background filter to the shared coefficient memory, and decoupling the first background filter from the shared coefficient memory, thereby allowing the second background filter to operate and preventing the first background filter from operating, and switching the shared coefficient memory from the second background filter to the first background filter includes coupling the first background filter to the shared coefficient memory and decoupling the second background filter from the shared coefficient memory, thereby allowing the first background filter to operate and preventing the second background filter from operating.

8. The echo canceller system of claim 7, in which switching the shared coefficient memory from the first background filter to the second background filter includes resetting the shared coefficient memory, thereby erasing filter coefficients of the first background filter stored in the shared coefficient memory, before coupling the second background filter to the shared coefficient memory, and switching the shared coefficient memory from the second background filter to the first background filter includes resetting the shared coefficient memory, thereby erasing filter coefficients of the second background filter stored in the shared coefficient memory, before coupling the first background filter to the coefficient memory.

9. The echo canceller system of claim 8, in which the receive input port is for receiving a far-end signal, and the send input port is for receiving a near-end signal.

10. The echo canceller system of claim 8, in which the first foreground filter is an adaptive filter, and the second foreground filter is an adaptive filter.

11. The echo canceller system of claim 8, in which the first foreground filter is a non-adaptive filter, and the second foreground filter is a non-adaptive filter.

12. The echo canceller system of claim 8, in which the first echo canceller is for canceling a first echo across a first echo path between the receive input port and the send output port, and the second echo canceller is for canceling a second echo across a second echo path between the receive output port and the send input port.

13. The echo canceller system of claim 12, in which the first echo is a line echo, and the second echo is an acoustic echo.

14. An echo canceller system comprising:

a receive path having a receive input port and a receive output port for receiving a far-end signal at the receive input port;

a send path having a send input port and a send output port for receiving a near-end signal at the send input port;

a first echo canceller, including a first foreground filter using first foreground filter coefficients stored in a dedicated first coefficient memory for canceling a first echo across a first echo path between the receive input port and the send output port, and including a first adaptive background filter using first background filter coefficients for updating the first foreground filter coefficients;

a second echo canceller, including a second foreground filter using second foreground filter coefficients stored in a dedicated second coefficient memory for canceling a second echo across a second echo path between the receive output port and the send input port, and including a second adaptive background filter using second background filter coefficients for updating the second foreground filter coefficients;

a shared coefficient memory of sufficient size to store one but not both of the first and second background filter coefficients; and a controller for switching the shared coefficient memory from the first background filter to the second background filter and resetting the shared coefficient memory, thereby allowing the first background filter to operate and preventing the second background filter from operating, in response to the far-end signal above a first threshold and the near-end signal below a second threshold, and for switching the shared coefficient memory from the second background filter to the first background filter and resetting the shared coefficient memory, thereby allowing the second background filter to operate and preventing the first background filter from operating, in response to the near-end signal above a third threshold and the far-end signal below a fourth threshold, such that the first and second background filters operate one at a time without exposing the first background filter to the second background filter coefficients and without exposing the second background filter to the first background filter coefficients.

15. The echo canceller system of claim 14, in which the first echo path transfers a line echo of the near-end signal to the receive input port, and the second echo path transfers an acoustic echo of the far-end signal to the send input port.

16. The echo canceller system of claim 15, as part of a loudspeaking telephone set.

17. An echo canceller system comprising:

a receive path with a receive input port and a receive output port;

a send path with a send input port and a send output port;

a first echo canceller including a first foreground filter for using first foreground filter coefficients and a first adaptive background filter for using first background filter coefficients;

a second echo canceller including a second foreground filter for using second filter coefficients and a second adaptive background filter for using second background filter coefficients;

a shared coefficient memory for storing filter coefficients;

a detector for detecting a receive state in response to signals at the send and receive paths, and for detecting a transmit state in response to signals at the send and receive paths; and a controller for coupling the first background filter to the shared coefficient memory and decoupling the second background filter from the shared coefficient memory and resetting the shared coefficient memory in response to the detector indicating a change from the receive state to the transmit state, and for coupling the second background filter to the shared coefficient memory and decoupling the first background filter from the shared coefficient memory and resetting the shared coefficient memory in response to the detector indicating a change from the transmit state to the receive state.

18. The echo cancelling system of claim 17, in which the first echo canceller is for cancelling a line echo received at the receive input port in response to a near-end signal received at the send input port, and the second echo canceller is for cancelling an acoustic echo received at the send input port in response to a far-end signal received at the receive input port.

19. The echo cancelling system of claim 17, in which the first foreground filter coefficients are related to the first background filter coefficients by a first function, and the second foreground filter coefficients are related to the second background filter coefficients by a second function.

20. The echo canceller system of claim 17, in which the first foreground filter generates a first replica signal, which is an estimate of the receive input signal, in response to the send input signal, and the second foreground filter generates a second replica signal, which is an estimate of the send input signal, in response to the receive input signal.

21. An echo canceller system comprising:

a receive path with a receive input port and a receive output port;

a send path with a send input port and a send output port;

a first echo canceller, including a first foreground filter coupled to a first foreground subtracter and a first adaptive background filter coupled to a first background subtracter, with the first background filter for updating the first foreground filter, and the first foreground filter for canceling a first echo signal at the receive input port which occurs in response to a send input signal at the send input port;

a second echo canceller, including a second foreground filter coupled to a second foreground subtracter and a second background filter coupled to a second background subtracter, with the second background filter for updating the second foreground filter, and the second foreground filter for cancelling a second echo signal at the send input port which occurs in response to a receive input signal at the receive input port;

a shared coefficient memory;

a detector for detecting signals at the send and receive paths; and a controller for coupling the first background filter to the shared coefficient memory and decoupling the second background filter from the shared coefficient memory and resetting the shared coefficient memory in response to the detector indicating a first state, and for coupling the second background filter to the shared coefficient memory and decoupling the first background filter from the shared coefficient memory and resetting the shared coefficient memory in response to the detector indicating a second state.

22. The echo canceller system of claim 21, including the first foreground filter for generating a first replica signal, which is an estimate of the first echo signal, in response to the send input signal, the second foreground filter for generating a second replica signal, which is an estimate of the second echo signal, in response to the receive input signal, the first foreground subtracter for generating the receive output signal representing a difference between the receive input signal and the first replica signal, and the second foreground subtracter for generating the send output signal representing a difference between the send input signal and the second replica signal.

23. The echo canceller system of claim 21, in which the signals at the send and receive paths include the send input signal and the receive input signal, respectively.

24. The echo canceller system of claim 21, in which the first and second echoes are line echos.

25. The echo canceller system of claim 21, in which the first echo is a line echo, and the second echo is an acoustic echo.

26. The echo canceller system of claim 21, in which
the receive output port is coupled to a loudspeaker,
the send input port is coupled to a microphone,
the receive input port is coupled to a first port of a hybrid transformer, and
the send output port is coupled to a second port of the hybrid transformer.

27. The echo canceller system of claim 26, in which
a first analog-to-digital converter is coupled between the first port and the receive input port,
a first digital-to-analog converter is coupled between the receive output port and the loudspeaker,
a second analog-to-digital converter is coupled between the send input port and the microphone, and
a second digital-to-analog converter is coupled between the send output port and the second port.

28. The echo canceller of claim 21, in which
the first foreground filter includes a first dedicated coefficient memory,
the second foreground filter includes a second dedicated coefficient memory,
the first background filter lacks a dedicated coefficient memory, and
the second background filter lacks a dedicated coefficient memory.

29. The echo canceller of claim 21, in which
the first background filter uses N first background filter coefficients,
the second background filter uses N second background filter coefficients, and
the shared coefficient memory uses N addressable memory locations.

30. The echo canceller of claim 29, in which
each first background filter coefficient has a length of M bits,
each second background filter coefficient has a length of M bits, and
each memory location has a length of M bits.

31. The echo canceller of claim 21, in which
the first background filter uses N/2 double-precision first background filter coefficients,
the second background filter uses N single-precision second background filter coefficients, and
the shared coefficient memory uses N addressable memory locations.

32. The echo canceller of claim 31, in which
each first background filter coefficient has a length of 2M bits,
each second background filter coefficient has a length of M bits, and
each memory location has a length of M bits.

33. The echo canceller system of claim 21, as part of an integrated circuit chip.

34. The echo canceller system of claim 21, as part of a loudspeaking telephone set.

35. A method of operating an echo canceller system with send and receive paths, first and second filters, and a shared coefficient memory, comprising the steps of:
detecting signals at the send path and the receive path, and
switching the shared coefficient memory between the first and second filters, including resetting the shared coefficient memory, in response to the signals.

36. The method of claim 35, in which
resetting the shared coefficient memory includes erasing all filter coefficients of one of the first and second filters stored in the shared coefficient memory thereby preventing the first and second filters from operating simultaneously and preventing any transfer of filter coefficients between the first and second filters.

37. The method of claim 36, including
detecting a receive state characterized by a larger signal level at the receive path than at the send path, and
detecting a transmit state characterized by a larger signal level at the send path than at the receive path,
switching the shared coefficient memory from the first filter to the second filter in response to changing from the transmit state to the receive state, and
switching the shared coefficient memory from the second filter to the first filter in response to changing from the receive state to the transmit state.

38. A method of using a shared coefficient memory in an echo cancelling system that includes first and second echo cancellers and send and receive paths, comprising the steps of:
(a) coupling the shared coefficient memory to the first echo canceller and decoupling the shared coefficient memory from the second echo canceller in response to a signal at the send path and a signal at the receive path indicating a first state, and
(b) coupling the shared coefficient memory to the second echo canceller and decoupling the shared coefficient memory from the first echo canceller in response to a signal at the receive path and a signal at the send path indicating a second state.

39. The method of claim 38, in which
the first echo canceller includes a first foreground filter and a first adaptive background filter,
the second echo canceller includes a second foreground filter and a second adaptive background filter,
step (a) includes coupling the shared coefficient memory to the first background filter and decoupling the shared coefficient memory from the second background filter and resetting the shared coefficient memory, thereby allowing the foreground filters and the first background filter to operate, erasing filter coefficients associated with the second background filter, and preventing the second background filter from operating, and
step (b) includes coupling the shared coefficient memory to the second background filter and decoupling the shared coefficient memory from the first background filter and resetting the shared coefficient memory, thereby allowing the foreground filters and the second background filter to operate, erasing filter coefficients associated with the first background filter, and preventing the first background filter from operating.

40. The method of claim 39, in which
step (a) includes the first background filter updating the first foreground filter after coupling the shared coefficient memory to the first background filter and decoupling the shared coefficient memory from the second background filter and resetting the shared coefficient memory, and
step (b) includes the second background filter updating the second foreground filter after coupling the shared coefficient memory to the second background filter and decoupling the shared coefficient memory from the first background filter and resetting the shared coefficient memory.

* * * * *